United States Patent [19]

Yntema et al.

[11] 4,242,255

[45] Dec. 30, 1980

[54] FIRE RETARDANT CURABLE ETHYLENICALLY UNSATURATED COMPOSITIONS

[75] Inventors: Klaas Yntema, Dieren; Cornelis D. W. Klos, Bennekom, both of Netherlands

[73] Assignee: Akzona Incorporated, Asheville, N.C.

[21] Appl. No.: 45,548

[22] Filed: Jun. 4, 1979

[30] Foreign Application Priority Data

Jun. 26, 1978 [NL] Netherlands .......................... 7806831

[51] Int. Cl.$^3$ ................................................ C08K 5/56
[52] U.S. Cl. ........................... 260/45.75 P; 260/40 R; 260/42.29
[58] Field of Search ............... 260/45.75 P, 40 R, 42.29

[56] References Cited

U.S. PATENT DOCUMENTS

| 3,882,058 | 5/1975 | La Brasseur et al. ..... 260/45.75 P X |
| 3,887,598 | 6/1975 | Eicke et al. ................ 260/45.75 P X |
| 4,013,815 | 3/1977 | Dorfman et al. .......... 260/45.75 P X |
| 4,035,325 | 7/1977 | Poppe et al. ............. 260/45.9 NC X |
| 4,148,841 | 4/1979 | Schwartz et al. ............. 260/45.75 B |
| 4,152,368 | 5/1979 | Dorfman et al. ............. 260/45.75 C |

FOREIGN PATENT DOCUMENTS 2236893  3/1975  France ................................ 260/45.75 P

OTHER PUBLICATIONS

*Chemical Abstracts* par. 49:5186i (Apr. 10, 1955).

*Primary Examiner*—Melvyn I. Marquis
*Attorney, Agent, or Firm*—Francis W. Young; Robert F. Green

[57] ABSTRACT

A composition comprising a curable, ethylenically unsaturated compound containing ester linkages and an effective fire retardant amount of N,N'-ethylene bis(salicylidene iminato) FE II, its oxidation product, or a mixture thereof, is disclosed. Also disclosed is a process for rendering fire retardant a curable ethylenically unsaturated composition containing ester linkages comprising adding to said composition an effective fire retardant amount of N,N'-ethylene bis(salicylidene iminato) FE II, its oxidation product, or a mixture thereof.

14 Claims, No Drawings

FIRE RETARDANT CURABLE ETHYLENICALLY UNSATURATED COMPOSITIONS

BACKGROUND OF THE INVENTION

This invention relates to fire retardant, curable, ethylenically unsaturated compositions containing ester linkages. This invention also relates to a process for rendering fire retardant a curable, ethylenically unsaturated composition containing ester linkages.

Fire retardant, curable, ethylenically unsaturated compositions are known from, inter alia, U.S. Pat. No. 4,013,815. The compositions contain unsaturated polyester resin which is cured by copolymerization of an unsaturated polyester and an ethylenically unsaturated monomer. Most iron compounds mentioned in the U.S. patent, such as ferric acetate, ferric formate, and ferrous tartrate, when added in an amount of 0.55 to about 50 percent, by weight, based on unsaturated polyester, are found to be fire retardant only to such a degree that at least 4.4 percent, by weight, of halogen, based on the amount of cured polyester resin must still be present in order for the compositions to be effectively fire retardant.

In view of the increasingly stringent demands made on industrial products, especially with respect to their effect on the environment, there is a very great need for unsaturated polyester resin compositions which have been made fire retardant without the inclusion of halogen compounds.

In view of the foregoing, an object of this invention is to provide curable, ethylenically unsaturated compositions containing ester linkages which have been made sufficiently fire retardant without the necessity for including a halogen compound.

SUMMARY OF THE INVENTION

There has now been discovered a composition comprising a curable, ethylenically unsaturated compound containing ester linkages and an effective fire retardant amount of N,N'-ethylene bis(salicylidene iminato) FE II, its oxidation product, or a mixture thereof.

There has also been discovered a process for rendering fire retardant a composition containing a curable, ethylenically unsaturated compound containing ester linkages. The process comprises adding to said composition an effective fire retardant amount of N,N'-ethylene bis(salicylidene iminato) FE II, its oxidation product, or a mixture thereof.

DESCRIPTION OF THE PREFERRED EMBODIMENTS

The compound N,N'-ethylene bis(salicylidene iminato) FE II, which has also been referred to in literature as bis(salicylidene) ethylene diimino iron (II), will, for the sake of brevity, be referred to hereinafter as Fe (salen). The oxidation product derived from Fe (salen) may be expressed by the formula [Fe (salen)]$_2$O. The structure of the latter compound is described in Coordination Chemistry Reviews, 9 (1972–1973) 311–337, Elsevier Scientific Publishing Company, Amsterdam.

Fe (salen) and [Fe (salen)]$_2$O are both soluble in ethylenically unsaturated compositions which are based on an ester group-containing compound and can be readily incorporated into it directly. The preparation of the compound may be performed as indicated in Chemical Abstracts 49, 5186 i(1955) for the corresponding cobalt compound, utilizing iron chloride, salicylaldehyde, and ethylenediamine.

It is extremely surprising that the iron compounds which are utilized in the practice of the present invention impart greatly enhanced fire retardancy to the present products upon the curing thereof, but have very little detrimental effect on the curing of the compounds. From the results of comparative experiments it has been determined that, for instance, the ferrous and ferric acetyl acetonates mentioned in U.S. Pat. No. 4,013,815, which are also known by the terms 2,4-pentanedione-Fe II and 2,4-pentanedione-Fe III, do display a strongly fire retardant effect in polyester resin compositions which contain very little, if any halogen, but are not suitable for the present purpose because of too rapid curing (see Table IV hereinbelow). Although the foregoing drawback may be minimized by taking special precautions, such as encapsulation, it will become evident that some solutions will encounter a large number of practical and economic drawbacks.

Of the curable, ethylenically unsaturated compositions based on an ester group-containing compound which may be used in accordance with the present invention for the preparation of fire retardant material, particularly suitable are those which are derived from a polycarboxylic compound and a polyhydric alcohol. Within the scope of the present invention polycarboxylic compounds include, for example, polycarboxylic acids, polycarboxylic anhydrides, polycarboxylic halides, and polycarboxylic esters. The unsaturation may be provided in the polycarboxylic compound or in the alcohol or in both. Typically the unsaturation is provided in one or more ethylenically unsaturated polycarboxylic compounds such as maleic acid, fumaric acid, ethylmaleic acid, itaconic acid, citraconic acid, mesaconic acid, and aconitic acid, or the acid chlorides, esters, or anhydrides derived therefrom.

Examples of typical ethylenically unsaturated alcohols include 2-butene-1,4-diol, 2-pentene-1,5-diol, and the unsaturated hydroxy ethers such as glycerol monoallyl ether and pentaerythritol diallyl ether.

The saturated polycarboxylic compounds which are suitable for use of the preparation of the present polyester resins may be derived from an aliphatic, cycloaliphatic, aromatic, or heterocyclic group. Examples of the foregoing include phthalic acid, isophthalic acid, terephthalic acid, adipic acid and/or succinic acid and the acid halides, acid anhydrides, and esters derived therefrom.

Examples of suitable saturated polyvalent alcohols include ethylene glycol, diethylene glycol, propylene glycol, dipropylene glycol, 1,4-butanediol, 1,5-pentanediol, 1,6-hexanediol, 2,2,4-trimethylpentane-1,3 diol, 1,4 cyclohexane dimethanol, glycerol, mannitol, sorbitol, substituted bisphenols, 2,2-bis(4-hydroxycyclohexyl) propane, and mixtures of the foregoing compounds.

Although the presence of halogen in the unsaturated compositions according to the present invention is not necessary in order to obtain fire retardant properties, the presence, in itself of halogen—for instance to obtain certain physical and/or chemical properties—is not excluded from the scope of the present invention.

Halogenated acids which may be used in the preparation of unsaturated polyester resins include tetrachlorophthalic acid and diclorosuccinic acid. Examples of halogenated alcohols include 2,3-difluorobutane-1,4-diol and 2,2-dichloromethyl propane-1,3-diol.

Moreover, the properties of unsaturated polyesters may still be modified by the incorporation therein of suitable monofunctional carboxylic acids and/or alcohols. Examples of suitable alcohols include 2,2-dichloroethanol and 1,1,1-trifluoropropane-2-ol. Examples of monofunctional acids include lauric acid and oleic acid.

Furthermore, the properties of unsaturated polyesters can be endlessly varied by the use of various types of acids and alcohols such as an unsaturated acid, a saturated acid, and a saturated alcohol.

In the preparation of unsaturated polyesters the starting materials generally used are maleic acid, maleic anhydride, or fumaric acid and ethylene glycol, 1,2-propylene glycol, or 1,3-butane diol. In addition to using bifunctional alcohols and acids in the formation of unsaturated polyesters, compounds having a combined hydroxyl and carboxyl function may be employed. In this respect, use may be made of hydroxy-pivalic acid.

If, in addition to bifunctional alcohols or acids, a small proportion of tri- or polyfunctional compounds is allowed to participate in the condensation, some degree of branching may be obtained. Examples of such compounds include 2,3,5-hexane tricarboxylic acid, trimellitic acid, glycerol, trimethylol propane, pentaerythritol, and tris-β-hydroxyethyl isocyanurate. In addition, the unsaturated polyesters may still contain groups other than ester groups, such as amide, imide, and urethane groups. Thus, the molecular weight of polyesters can be considerably increased by reacting the terminal groups with diisocyanates.

The preparation of unsaturated polyesters may take place in the melt or by azeotropic condensation. When use is made of acid anhydrides and epoxides, the preparation in the melt is effected by polyaddition. The typical procedure starts from approximately equivalent amounts of acids and alcohols, which are esterified to the desired molecular weight at 170° to 230° C. Use may be made of catalysts such as para-toluene sulphonic acid, benzene sulphonic acid and β-naphthalene sulphonic acid.

The curing of unsaturated polyesters typically takes place in the presence of an ethylenically unsaturated copolymerizable monomer, such as styrene, or less often, diallyl phthalate or triallyl cyanurate. Other monomers which may be used in curing are α-methyl styrene, vinyl toluene, 2-chlorostyrene, 2,5-diclorostyrene, paradivinyl benzene, methacrylic methyl ester, acrylic methyl ester, acrylic-tertiary-butyl ester, acrylonitrile, acrylamide, triacryl formal, vinyl acetate, N-vinyl pyrrolidone, 2-vinyl pyridine, N-vinyl carbazole, and mixtures of the foregoing compounds.

In place of the aforementioned diallyl phthalates, suitable monomers include, for example, one or more of the following compounds: diallyl fumarate, allyldiglycol carbonate, allyllidene diacetate, dimethallyl terephthalate, butane diol diallyl ether, glycerol diallyl ether adipate, and the tetraallyl ether of tetramethylol acetylene diurea.

In addition to the aforementioned typically monomers there may also be present other copolymerizable compounds such as maleimide and esters and half esters of maleic acid and fumaric acid. Several salts derived from the aforementioned half esters and polyvalent metals such as, aluminium, dissolve in polyester resins. The dissolution is often accompanied by a considerable increase in viscosity, which may be of importance with respect to moulding materials. The amount of ethylenically unsaturated monomer in the mixture is also chosen so that after polymerization, a thermosetting polymer is obtained. Depending upon the desired properties, the weight percentage of unsaturated polyester in the polyester resin may vary from about 10 to about 90 percent, without the use of any further additives.

The polymerization reaction is generally commenced by a free-radical initiating catalyst, resulting in a crosslinked and cured polyester resin. The temperature at which the reaction is initiated is dependent upon the catalyst system which is utilized. When use is made of cobalt naphthenate and methylethyl ketone peroxide curing may be effected at room temperature. The unsaturated polyester and the ethylenically unsaturated monomer are preferably mixed at elevated temperature in order to bring about better dissolution and homogenization. To prevent premature polymerization it is preferable that, prior to the mixing operation, a polymerization inhibitor be included in the unsaturated polyester. Subsequently, a catalyst and, if need be, also an accelerator are added. The percentage by weight of polymerization inhibitor is generally in the range of from about 0.001 to about 1 percent, by weight, of the mixture to be polymerized.

Examples of polymerization inhibitors which may be successfully applied include hydroquinone, benzoquinone, para tertiary butylcatechol, para-phenylene diamine, trinitrobenzene, and picric acid. Examples of suitable catalysts include benzoyl peroxide, acetyl peroxide, lauryl peroxide, methylethyl ketone peroxide and cumene hydroperoxide. The amount to be used is dependent on the activity and the presence of inhibitors and generally varies from about 0.01 to about 10 percent, by weight, based on the amont of resin.

The polymerization reaction may also be promoted by the use of accelerators such as metals or metal salts, such as cobalt octoate, cobalt maleate and cobalt naphthenate, or amines such as dimethylamine, dibutylamine, or mercaptans such as dodecyl mercaptan. The accelerators are generally employed in the same amount as, or in a smaller amount than, the catalyst.

It has been found that not only typical unsaturated polyesters, but also compositions based on an ethylenically unsaturated ester having the following formula:

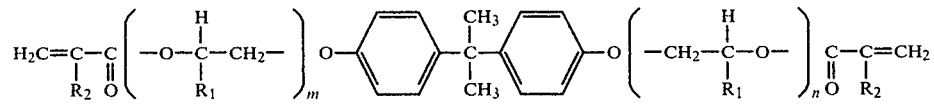

wherein $R_1$ and $R_2$ are independently selected from the group consisting of hydrogen and methyl, and m and n are integers from about 1.0 to about 3.0, are suitable for the preparation of fire retardant compositions according to the present invention. It is preferred, however, that as the ethylenically unsaturated ester, 2,2-bis-[para-(β-hydroxyethoxy)phenyl] propane dimethacrylate should be used.

Curing may be effected in a manner corresponding to the aforementioned process for use with unsaturated polyesters, utilizing a free-radical initiator such as a peroxidic compound, an azo compound, or a compound such as hexaphenyl ethane or 1,2-diphenyl-1,2-dicyanoethane-1,2-dicarboxylic dimethyl ester. Preferably one should utilize radical initiators which are useful at temperatures in the range from about 60° to about 175° C., preferably in the range from about 120° to about 160° C. As indicated above for the unsaturated polyesters, curing may also take place at lower temperatures in the presence of the aforementioned initiators in combination with polymerization accelerators such as cobalt octoate or amines such as dimethyl aniline. Curing may also be effected by means of UV radiation in the presence of UV-initiators, or by irradiation with accelerated electrons, typically known as electron-beam curing.

The organic iron compound Fe (salen), [Fe (salen)-]$_2$O, and mixtures thereof, may be incorporated into one or more of the reaction components at any time prior to curing.

It has been found that along with the other desired properties, sufficient fire retardancy typically may be obtained if the iron compound is used in an amount from about 0.1 to about 10 percent, by weight, calculated on the mixture of fire retardant additive and components participating in the curing process. It is also possible, however, to use concentrations in the order of, for example, 15 or 20 percent.

The concentration at which the best fire retardancy is obtained is dependent upon the composition of the cured compositions. It will not be difficult for one skilled in the art to establish the optimum range within which maximum protection against fire is obtained. It has been found that such a range may be dependent upon whether a filler has been included.

Suitable fillers include various metal oxides, glass fibers, asbestos fibers, mica, colemanite, powdered chalk, powdered quartz, powdered aluminium mica, aluminium oxide, aluminium hydroxide, aluminium sulphate, wollastonite, ground and precipitated chalk, magnesium carbonate, kaolin, titanium dioxide, and talc.

It has also been found that the presence of antimony trioxide, which is often utilized as a synergist in fire retardant additives for polymers, produces an opposite effect in the compositions of the present invention.

The concentration of fillers to be incorporated into the present curable compositions is dependent upon many factors, including both physical and economic considerations. The best fire retardant properties are typically obtained when the filler is utilized in an amount from about 2 to about 60 percent, by weight, based on the mixture of filler and components participating in the curing process in the presence of an iron compound which is itself utilized in an amount from about 0.1 to about 5 percent, by weight, based on the mixture of fire retardant additives and components participating in the curing process.

It has been found that a distinctly synergistic effect may result from the use of the foregoing combination of substances. For a number of applications, the goal will be a cured composition having optimum fire retardant properties obtained at a minimum filler concentration, to achieve the foregoing goal, the present invention provides a curable composition containing a filler in an amount of from about 5 to about 20 percent, based on the mixture of filler and components participating in the curing process, in the presence of an amount of iron compound of 0.1 to 3.5 percent, by weight, based on the mixture of iron compound and components participating in the curing process.

The present invention is further illustrated by the following non-limiting examples:

The fire retardant properties obtained in the following examples were determined by measuring the Oxygen Index (OI) in conformity with ASTM D 2863-70, unless otherwise indicated. The higher the OI obtained, the more fire retardant is the cured composition. The resins utilized in the examples were composed as follows:

Resin 1

An unsaturated polyester was prepared from 15.2 parts by weight of phthalic anhydride; 23.5 parts by weight of maleic anhydride and 27.3 parts by weight of propylene glycol. The resulting product was mixed with 34 parts by weight of styrene, 2 parts by weight of a 50% by weight solution in water of methyl ethyl ketone peroxide and 0.5 parts by weight of a 1% by weight solution in water of cobalt octoate. Curing for 24 hours at 20° C. was followed by after-curing for 2 hours at 120° C.

Resin 2

The unsaturated polyester for this resin was prepared from 22.1 parts by weight of phthalic anhydride; 14.6 parts by weight of maleic anhydride; 21.6 parts by weight of propylene glycol and 4.8 parts by weight of diethylene glycol. The unsaturated polyester obtained with these components was mixed with 36.9 parts by weight of styrene; 2 parts by weight of a 50% by weight solution in water of methyl ethyl ketone peroxide and 0.5 parts by weight of a 1% by weight solution in water of cobalt octoate. Curing was effected in the manner indicated under Resin 1.

Resin 3

The unsaturated polyester was prepared from 19.7 parts by weight of isophthalic acid; 11.6 parts by weight of maleic anhydride and 24.7 parts by weight of neopentyl glycol. The unsaturated polyester thus obtained was mixed with 44 parts by weight of styrene, 2 parts by weight of a 50% by weight solution in water of methyl ethyl ketone peroxide and 0.5 parts by weight of a 1% by weight solution in water of cobalt octoate. Curing was effected as indicated for Resin 1.

Resin 4

The resin was prepared by radical polymerization of 100 parts of 2,2-bis-(p-($\beta$-hydroxy-ethoxy)-phenyl) propane dimethacrylate in the presence of 2 parts of a 40% by weight solution in water of dibenzoyl peroxide. Curing took place at a temperature of 70° C. and lasted 24 hours, followed by after-curing for 2 hours at 120° C.

Resin 5

The unsaturated polyester for this resin was prepared from 9.8 parts by weight of maleic anhydride; 14.8 parts by weight of phthalic anhydride; 6.8 parts by weight of ethylene glycol and 8.7 parts by weight of 1,2-propanediol. Of the unsaturated polyester thus obtained 65 parts by weight were mixed with 35 parts by weight of styrene, 2 parts by weight of a 50% by weight solution in water of methyl ethyl ketone peroxide and 0.5 parts by weight of a 1% by weight solution in water of cobalt octoate. Curing was carried out as indicated under Resin 1.

The resin compositions described in the following examples were invariably obtained by thoroughly mixing the fire retardant additives along with fillers, when utilized, into a mixture of the unsaturated compositions. It was then determined that the Fe (salen) and its oxidation product, [Fe (salen)]$_2$O, completely dissolves in the mixture. After the required cross-linking agents had been added, the resin compositions were cured in glass vessels having the dimensions standardized for OI (Oxygen Index) bars in accordance with ASTM D2863-70. The results are summarized in the tables. The concentrations of additives in the form of fire retardant compound and filler are expressed in grams of additive per 100 grams of resin (thus, the components participating in the curing process, plus additives).

EXAMPLE I

Of the above-mentioned 5 resins the Oxygen Index as a function of the Fe (salen) concentration was determined.

The results are listed in the following Table I.

TABLE I

| Resin No. | Amount of Fe (salen) in g per 100 g mixture | Oxygen Index (OI) Resin | Resin + Fe (salen) | ΔOI |
|---|---|---|---|---|
| | 0.32 | 18.7 | 22.9 | 4.2 |
| | 1.61 | 18.7 | 22.0 | 3.3 |
| | 3.22 | 18.7 | 22.6 | 3.9 |
| | 6.44 | 18.7 | 22.1 | 3.4 |
| | 9.67 | 18.7 | 20.9 | 2.2 |
| 2 | 0.32 | 19.0 | 20.1 | 1.1 |
| | 1.61 | 19.0 | 24.2 | 5.2 |
| | 3.22 | 19.0 | 26.8 | 7.8 |
| | 6.44 | 19.0 | 24.1 | 5.1 |
| | 9.67 | 19.0 | 22.7 | 3.7 |
| 3 | 0.32 | 19.4 | 21.0 | 1.6 |
| | 1.61 | 19.4 | 23.0 | 3.6 |
| | 3.22 | 19.4 | 22.5 | 3.1 |
| | 6.44 | 19.4 | 22.5 | 3.1 |
| | 9.67 | 19.4 | 22.4 | 3.0 |
| 4 | 0.32 | 17.7 | 24.3 | 6.6 |
| | 1.61 | 17.7 | 24.5 | 6.8 |
| | 3.22 | 17.7 | 23.5 | 5.8 |
| | 6.44 | 17.7 | 23.0 | 5.3 |
| | 9.67 | 17.7 | 20.3 | 2.6 |
| 5 | 0.32 | 18.5 | 20.0 | 1.5 |
| | 1.61 | 18.5 | 22.0 | 3.5 |
| | 3.22 | 18.5 | 24.9 | 6.4 |
| | 6.44 | 18.5 | 23.9 | 5.4 |
| | 9.67 | 18.5 | 22.7 | 4.2 |

EXAMPLE II

The following table gives the results of experiments with 1.61 g Fe (salen) per 100 g resin No. 3 plus Fe (salen), to which also 10 g filler per 100 g mixture had been added.

TABLE II

| | Oxygen Index | | | |
|---|---|---|---|---|
| Filler | Resin No. 3 | Resin + Fe (salen) | Resin + filler | Resin + Fe (salen) + filler |
| Talc | 19.4 | 23.0 | 19.4 | 27.3 |
| Wollastonite (CaSiO$_3$)$_3$ | 19.4 | 23.0 | 19.4 | 27.4 |
| CaCO$_3$ | 19.4 | 23.0 | 20.3 | 25.0 |
| Mica | 19.4 | 23.0 | 20.4 | 25.4 |
| TiO$_2$ | 19.4 | 23.0 | 20.8 | 25.3 |

The above tables clearly demonstrates the considerable synergistic effect produced on the one hand as a result of the indicated amounts of Fe (salen) and on the other hand as a result of the various fillers.

EXAMPLE III

In this example the results are given of a number of OI-measurements on the Resins 2 and 3, use having been made of varying amounts of Fe (salen) and filler.

The results are listed in the following table.

TABLE III

| Resin No. | Amount of Fe (salen) in g per 100 g mixture of Fe(salen) + resin | Amount of talc in g per 100 g resin + talc | Oxygen Index Resin | Resin + Fe(salen) | Resin + talc | Resin + Fe (salen) + talc |
|---|---|---|---|---|---|---|
| 2 | 2.0 | 10.0 | 19.0 | 25.6 | 19.0 | 26.4 |
| | 2.0 | 40.0 | 19.0 | 25.6 | 21.0 | 23.4 |
| | 5.0 | 10.0 | 19.0 | 24.0 | 19.0 | 25.0 |
| | 5.0 | 40.0 | 19.0 | 24.0 | 21.0 | 22.5 |
| | 10.0 | 10.0 | 19.0 | 22.0 | 19.0 | 23.2 |
| | 10.0 | 40.0 | 19.0 | 22.0 | 21.0 | 24.6 |
| 3 | 2.0 | 10.0 | 19.4 | 25.4 | 19.4 | 28.3 |
| | 2.0 | 40.0 | 19.4 | 25.4 | 20.8 | 26.5 |
| | 5.0 | 10.0 | 19.4 | 23.0 | 19.4 | 25.0 |
| | 5.0 | 40.0 | 19.4 | 23.0 | 20.8 | 25.8 |
| | 10.0 | 10.0 | 19.4 | 21.6 | 19.4 | 23.6 |
| | 10.0 | 40.0 | 19.4 | 21.6 | 20.8 | 24.0 |

EXAMPLE IV (COMPARATIVE EXAMPLE)

In this example the results are given of experiments on the one hand with Fe (salen) and on the other hand with other bis(salicyclidene) ethylene diimino metal compounds. Moreover, the results are included obtained with other known iron compounds.

The various data are listed in the following table.

The compounds mentioned therein are referred to by their trivial names, and term Co (salen) referring to the cobalt compound, the term Ni (salen) to the nickel compound, and the term Mn (salen) to the manganese compound.

In all cases the concentration of the fire retardant additive was 2 grams per 100 grams of resin plus additive.

The filler was talc. Its concentration was 10 g per 100 g of resin plus filler.

TABLE IV

| Resin | Fire retardant compound | Resin | Resin + talc | 40 Oxygen Index Resin + fire retardant additive | Resin + talc + fire retardant additive | Notes |
|---|---|---|---|---|---|---|
| 2 | Fe(salen) | 19.0 | 19.0 | 25.6 | 26.4 | according to invention |
|  | Mn(salen) | 19.0 | 19.0 | 19.2 | — |  |
|  | Ni(salen) | 19.0 | 19.0 | 19.2 | — |  |
|  | Co(salen) | 19.0 | 19.0 | 18.9 | — |  |
| 3 | Fe(salen) | 19.4 | 19.4 | 25.4 | 28.3 | according to invention |
|  | Mn(salen) | 19.4 | 19.4 | 20.0 | 22.3 |  |
|  | Ni(salen) | 19.4 | 19.4 | 20.4 | 20.8 |  |
|  | Co(salen) | 19.4 | 19.4 | 19.4 | 21.0 |  |
| 2 | $Fe_2O_3$ | 19.0 | 19.0 | 20.7 | — |  |
|  | Ferrooxalate 2 $H_2O$ | 19.0 | 19.0 | 19.2 | — |  |
|  | Ferric phosphate | 19.0 | 19.0 | 18.7 | — |  |
|  | EDTA-Fe(III) Na | 19.0 | 19.0 | 19.7 | — |  |
|  | 2,4-pentane dione Fe(III) | 19.0 | 19.0 | 23.6 | — | unsuitable for use because of too rapid curing |
|  | 2,4-pentane dione Fe(II) | 19.0 | 19.0 | 20.0 | — |  |
|  | Ferric citrate | 19.0 | 19.0 | 19.0 | — |  |
|  | Ferrocene | 19.0 | 19.0 | — | — | unsuitable because of inhibiting effect on curing reaction |
|  | Basic ferric acetate | 19.0 | 19.0 | 21.3 | — |  |
| 3 | $Fe_2O_3$ | 19.4 | 19.4 | 21.0 | 22.0 |  |
|  | Ferrooxalate $2H_2O$ | 19.4 | 19.4 | 19.5 | 20.6 |  |
|  | Ferric phosphate | 19.4 | 19.4 | 19.0 | 20.2 |  |
|  | EDTA-Fe(III) Na | 19.4 | 19.4 | 21.2 | 23.5 |  |
|  | 2,4-pentane-dione-Fe(II) | 19.4 | 19.4 | 24.0 | 24.6 | Unsuitable because of too rapid curing |
| 3 | 2,4-pentane-dione-Fe(III) | 19.4 | 19.4 | 25.5 | 26.8 | unsuitable because of too rapid curing |
|  | Ferric citrate | 19.4 | 19.4 | 20.0 | 20.4 |  |
|  | Ferrocene | 19.4 | 19.4 | 24.4 | 25.3 | unsuitable because of inhibiting effect on curing reaction |
|  | Basic ferric acetate | 19.4 | 19.4 | 20.6 | 21.9 |  |

The results mentioned in the above table clearly show that the use of Fe (salen) as fire retardant additive in curable ethylenically unsaturated compositions based on a compound containing ester groups unexpectedly leads to far better results than obtained with other known iron compounds.

What is claimed is:

1. A composition comprising a curable, ethylenically unsaturated compound containing ester linkages and an effective fire retardant amount of an organic iron compound selected from the group consisting of N,N'-ethylene bis(salicylidene iminato) Fe II, its oxidation product, and mixtures thereof.

2. The composition of claim 1 wherein the amount of organic iron compound is from about 0.1 to about 10%, by weight, calculated on the mixture of fire retardant additive and components participating in the curing process.

3. The composition of claim 1 or 2 also comprising from about 2 to about 60%, by weight, of a filler, based on the mixture of filler and components participating in the curing process in the presence of an iron compound which is itself utilized in an amount from about 0.1 to about 5 percent, by weight, based on the mixture of fire retardant additives and components participating in the curing process.

4. The composition of claim 1 also comprising from about 5 to about 20 percent, by weight, of filler, based on the mixture of filler and components participating in the curing process, in the presence of an amount of iron compound of 0.1 to 3.5 percent, by weight, based on the mixture of iron compound and components participating in the curing process.

5. The composition of claim 1, 2, 3, or 4, wherein the ethylenically unsaturated compound containing ester linkages is an unsaturated polyester.

6. The composition of claim 5 also comprising an ethylenically unsaturated monomer which is copolymerizable with the unsaturated polyester.

7. The composition of claim 1 also comprising an ethylenically unsaturated monomer which is copolymerizable with the ethylenically unsaturated compound containing ester linkages.

8. The composition of claim 1, 2, 3, or 4, wherein the ethylenically unsaturated compound containing ester linkages is an unsaturated ester of the following formula:

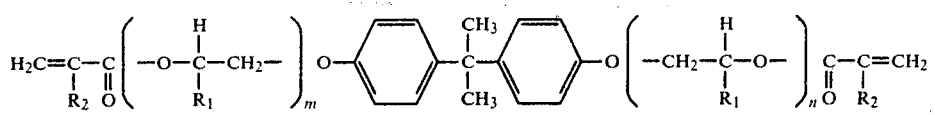

wherein $R_1$ and $R_2$ are independently selected from the group consisting of hydrogen and methyl, and m and n are integers from about 1.0 to about 3.0.

9. A process for rendering fire retardant a composition containing a curable, ethylenically unsaturated composition containing ester linkages comprising adding to said composition an effective fire retardant amount of an organic iron compound selected from the group consisting of N,N'-ethylene bis(salicylidene iminato) Fe II, its oxidation product, or a mixture thereof.

10. The process of claim 9 wherein the organic iron compound is utilized in an amount from about 0.1 to about 10%, by weight, calculated on the mixture of fire retardant additive and components participating in the curing process.

11. The process of claim 9 wherein the composition also comprises from about 2 to about 60%, by weight, based on the total weight of the composition, of a filler, based on the mixture of filler and components participating in the curing process in the presence of an iron compound which is itself utilized in an amount from about 0.1 to about 5 percent, by weight, based on the mixture of fire retardant additives and components participating in the curing process.

12. The process of claim 10 or 11 wherein the composition comprises from about 5 to about 20%, by weight, of filler, based on the mixture of filler and components participating in the curing process, in the presence of an amount of iron compound of 0.1 to 3.5 percent, by weight, based on the mixture of iron compound and components participating in the curing process.

13. The process of claim 9, 10, or 11, wherein the curable, ethylenically unsaturated compound containing ester linkages is an ethylenically unsaturated ester of the following formula:

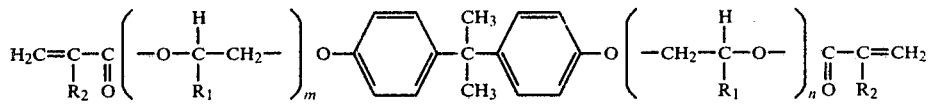

wherein $R_1$ and $R_2$ are independently selected from the group consisting of hydrogen and methyl, and m and n are integers from about 1.0 to about 3.0.

14. A composition comprising a polymer obtained by curing a curable, ethylenically unsaturated compound containing ester linkages and an effective amount of an organic iron compound selected from the group consisting of N,N'-ethylene bis(salicylidene iminato) Fe II, its oxidation product, and mixtures thereof.

* * * * *